United States Patent Office 2,914,120
Patented Nov. 24, 1959

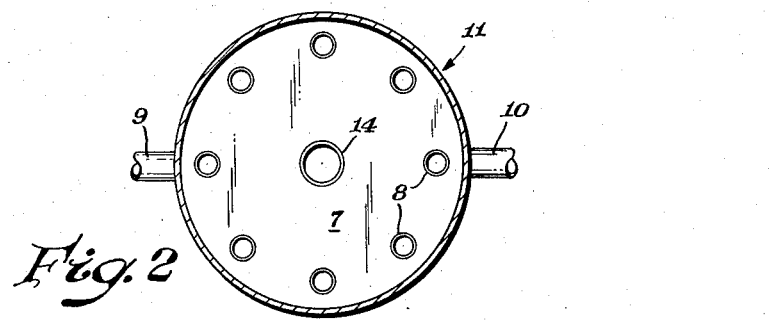
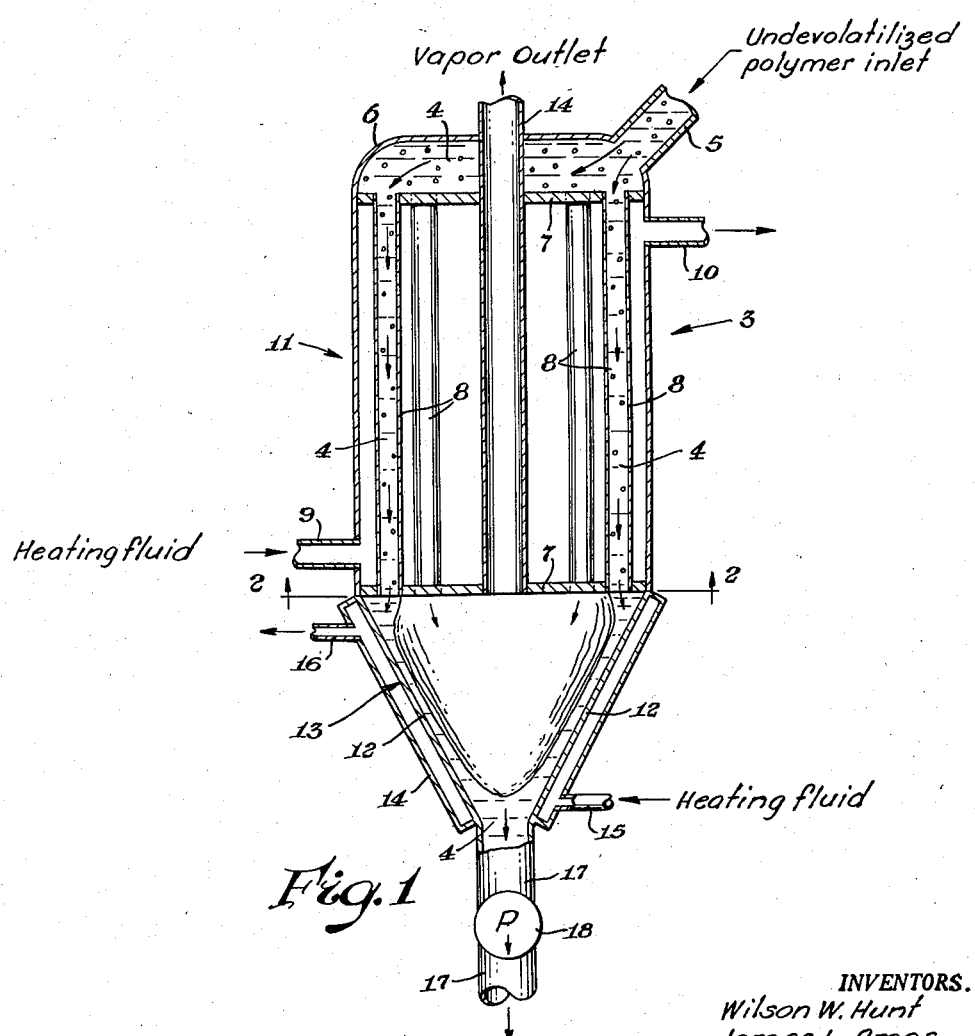

2,914,120

DEVOLATILIZER

Wilson W. Hunt and James L. Amos, Midland, Mich., assignors to The Dow Chemical Company, Midland, Mich., a corporation of Delaware Application January 9, 1957, Serial No. 633,315

2 Claims. (Cl. 159—27)

In conventional metal apparatus for removing fugacious constituents from molten or otherwise liquid freshly prepared polymeric compositions, the devolatilizing chambers that are utilized allow the escaping constituents to freely contact the hot, bare metal walls of the chambers above the liquid level of the polymer during the exodus of the volatile and readily decomposed monomers and low molecular weight polymers and any of the various gases that may be present. Such contact may cause or permit considerable quantities of dark, solid, scale-like deposits (usually carbonaceous in nature) to accumulate as an extensive, usually complete encrustation on the bare metal walls of the chamber. The polymeric compositions that are being devolatilized may frequently be seriously and intolerably contaminated with fallen specks of the deposits that have become dislodged to flake off during operation of the apparatus. The indicated advenience is especially acute when various alkenyl aromatic polymer compositions such as polystyrene, polyvinyltoluene and the like are being handled in the typical devolatilizing contrivances.

To the obviation of such undesirable consequences, the chief aim and concern of the present invention is the provision of an improved metal devolatilizer for polymeric compositions, especially one that would be efficient and exceptionally efficacious for precluding difficulties of the indicated nature when handling alkenyl aromatic polymer compositions.

Accordingly, a metal devolatilizer within the purview of the invention is essentially comprised of a devolatilizing chamber having an upwardly funneled or flaring conical wall in combination with means for circumferentially feeding the polymeric composition being devolatilized to the upper inner periphery of the inwardly sloping conical chamber to permit it to flow downwardly through the chamber as a uniform coating over the chamber wall to collection and transferring means at the bottom of the chamber. The flowing, wall-coating layer of the polymeric composition protects the inner metal wall surface of the devolatilizing chamber from being contacted with the hot, volatile constituents that are being removed. As a result, the possibility for decomposition of the volatile consituents on the hot, bare metal walls of the devolatilizing chamber is eliminated and accumulations of the troublesome dislodgeable deposits and consequent contamination of the polymer are effectively avoided.

The accompanying drawing is schematically illustrative of a suitable embodiment of a devolatilizer that includes additional features and advantages according to the invention. In the drawing, the apparatus is shown in elevation (predominantly in section) in Figure 1 and in cross-section in Figure 2, as taken along the line 2—2 in Figure 1.

The devolatilizer, indicated generally by the reference numeral 3, may consist of a polymer feed section, a heating section and the devolatilizing chamber, each respectively indicated in general by the reference numerals 6, 11 and 13. The undevolatilized polymer composition is admitted (as from a polymerizing unit not shown) through the inlet 5 into a header in the polymer feed section 6 to be distributed to the heating tubes 8 in the heating section 10. The flow through the apparatus of the liquid polymer composition, which is identified by the reference numeral 4, is indicated by the directional arrows.

Advantageously, a vertically disposed tubular heating section or tube chest 11 is utilized above the devolatilizing chamber 13, although other arrangements for heating the undevolatilized polymer may also be made. Thus, a circularly disposed plurality of polymer heating tubes 8, which are fixed between the upper and lower tube sheets 7, carry the polymer composition from the header arrangement in the feed section 6 through the heat chest in the heating section 11 to circumferentially discharge it against the inner periphery of the inwardly sloping conical walls 12 of the devolatilizing chamber 13. Any desired number of polymer tubes 8 may be utilized. They may be arranged in a single circular bank, as shown, or in plural banks, if desired. A suitable heat-exchanging fluid at a sufficient temperature to bring the polymer to an efficient devolatilizing condition, is passed in and out of the heat chest in the heating section 11 through the inlet and outlet connections 9 and 10 respectively.

The polymeric composition 4 flows downwardly through the conical devolatilizing chamber 13 as a uniform, relatively thin coating over its hot, bare metal walls 12. The volatile constituents removed from the polymeric composition in the devolatilizing chamber 13 pass up through a central, upright vapor conduit 14 that connects to the top of the devolatilizing chamber and which, beneficially, may be in communication outside the apparatus with a suitable vacuum source (not shown) and, if desired, with a recovery system. The devolatilized polymeric composition 4 collects as a pool in the bottom of the conical devolatilizing chamber 13. From this point it is transferred, by means of a suitable pump or other forwarding device 18, through an outlet 17 to an extruder (not shown) or other desired subsequent handling means. The conical devolatilizing chamber 13 may advantageously be heated separately from the heating section 11 in order to maintain a good flow of the polymeric composition down its walls and to prevent solidification of polymer therein. For this purpose, the chamber 13 may be provided with a jacket 14, having inlet and outlet connections 15 and 16, respectively, through which a suitable heat-exchanging fluid may be circulated.

Apparatus in accordance with the invention, which preferably is constructed from aluminum or a corrosion-resisting variety of steel, has been used to devolatilize polystyrene successfully for extended periods without forming objectionable deposits on the side walls of the devolatilizing chamber. An excellent, substantially uncontaminated product was consistently obtained in the operations. Like devolatilizers may be readily adapted for advantageous utilization with other varieties of polymer compositions.

Many obvious changes and modifications can be made in the practice of the present invention without departing from its intended spirit and scope as it is delineated in the hereto appended claims.

What is claimed is:

1. Combined in apparatus for devolatilizing polymeric compositions, a devolatilizing chamber consistenting substantially of an upwardly funneled conical wall that terminates and is closed by a tube sheet, at the uppermost limit of said chamber; a tube chest, having said tube sheet as a part thereof, positioned above said chamber; a single, circularly arranged bank of vertically disposed tubes in said tube chest that open through said tube sheet and discharge against the upper inner periphery of the inwardly sloping wall of said devolatilizing chamber for feeding the polymeric composition to be devolatilized to said upper inner periphery at about the top of the inwardly sloping conical chamber so as to permit it to flow downwardly through the chamber as a uniform coating over its wall; means for heating said tubes to elevate the polymeric composition being fed therethrough, to an efficient devolatilizing temperature; an axial tube from said devolatilizing chamber passing through said tube sheet and tube chest for evacuating volatile constituents from said chamber; and means for removing devolatilized polymer as it collects in the bottom of said chamber.

2. The combination of claim 1 and additionally including means for heating said devolatilizing chamber to a flowing temperature for the polymeric composition being devolatilized.

References Cited in the file of this patent

UNITED STATES PATENTS

| | | |
|---|---|---|
| 1,263,747 | Davis | Apr. 23, 1918 |
| 2,090,984 | Peebles | Aug. 24, 1937 |
| 2,092,470 | Peebles | Sept. 7, 1937 |
| 2,257,531 | Peebles | Sept. 30, 1941 |
| 2,377,424 | Ittner | June 5, 1945 |
| 2,624,401 | Schilt | Jan. 6, 1953 |
| 2,731,081 | Mayner | Jan. 17, 1956 |
| 2,798,544 | Davis | July 9, 1957 |

FOREIGN PATENTS

| | | |
|---|---|---|
| 1,074,062 | France | Oct. 1, 1954 |
| 6,478 | Great Britain | 1892 |